April 23, 1946.   C. D. GLOVER   2,399,112
LAWN SPRINKLER
Filed March 2, 1945
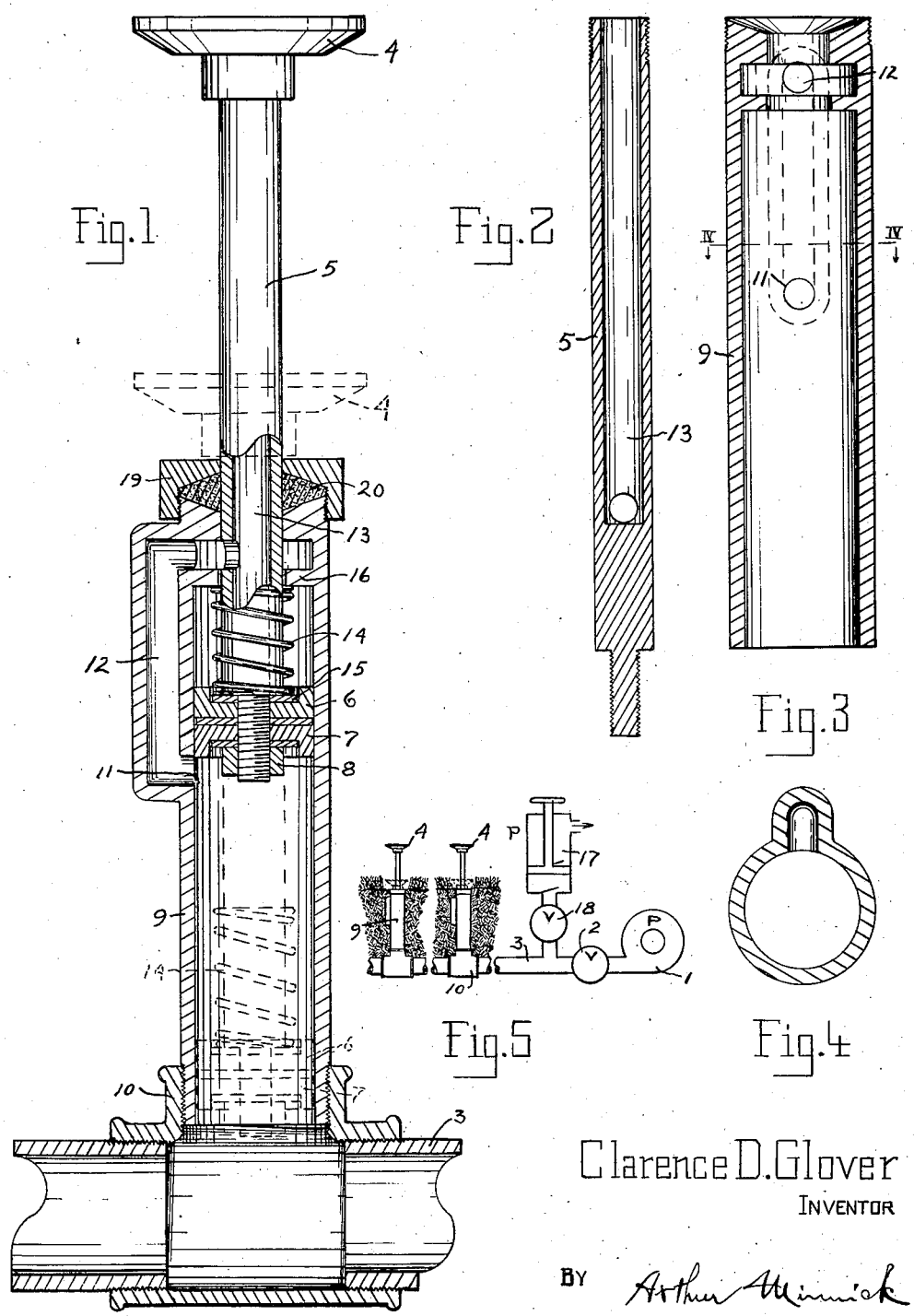
Clarence D. Glover
INVENTOR
BY Arthur Minnick
ATTORNEY Patented Apr. 23, 1946

2,399,112

UNITED STATES PATENT OFFICE 2,399,112

LAWN SPRINKLER

Clarence D. Glover, Tampa, Fla.

Application March 2, 1945, Serial No. 580,652

4 Claims. (Cl. 299—61)

This invention relates to lawn sprinkling systems in which a plurality of sprinkler heads are supplied by pipes laid beneath the surface of the ground.

The primary object of the invention is the provision of means for causing the sprinkler heads to be elevated above the surface of a lawn when they are to be used for sprinkling and of means for causing the heads to recede from their operative position to rest beneath the surface of the lawn when not in use.

In lawn sprinkling systems, the heads are usually set high enough so that grass will not interfere with the spray even when the grass has grown long enough to be ready for cutting. Such permanently elevated heads are frequently in the way. They are subject to damage from lawn mowers and are a hazard for playing children and for persons walking across the lawn.

When the sprinkler heads of the present invention are lowered below the level of the sod, a lawn-mower can roll harmlessly over them, and they will not catch one's foot to cause a fall.

In the accompanying drawing of a preferred embodiment of the invention chosen for purposes of illustration, Figure 1 is a vertical section through a cylinder and piston forming part of the water supply line for a conventional type of sprinkler head; Fig. 2 is a central longitudinal section through the tubular stem of the piston; Fig. 3 is a central longitudinal section of the cylinder taken at right angles to the section plane of Fig. 1; Fig. 4 is a transverse section of the cylinder on the plane IV—IV of Fig. 3; and Fig. 5 is a diagrammatic view of the pressure and suction apparatus and the control valves.

Referring to Fig. 5, the pump 1 indicates the source of water. The valve 2 controls the flow of water in pipe 3 supplying a line of sprinkler heads 4, 4.

Each head is carried by a tubular piston 5 upon the lower end of which is a threaded end to receive the cup leathers 6 and 7 secured in place by the nut 8. Normally, when the sprinklers are not in use, these leathers are in the broken line position at the lower end of the cylinder 9 in Fig. 1. The cylinder is mounted in a T 10 of the pipe 3.

When the valve 2 is opened, the pressure on the water in the pipe 3 is transmitted to the cup leather 7, causing the piston to slide upward until the lower rim of the leather is lifted above the entrance 11 to the by-pass 12. The water rises through the by-pass and enters the tubular channel 13 in the piston, on the upper end of which is the sprinkler head 4. A spring 14 surrounding the lower portion of the piston rests at its lower end on a washer 15 on the leather 6, and the top of the spring engages an annular shoulder or partition 16 formed within the cylinder 9. The spring is made of a length of coil such that the pressure of the water on the leather 7 will hold the spring under compression while the sprinkler operates.

When the valve 2 is closed, the expansion of the spring 14 will force the piston downward far enough to close the entrance 11 of the by-pass 12, the water beneath the leather escaping from the entrance 11 as the piston is lowered. The partition 16 is an abutment for the spring but clears the piston enough to permit water to pass while the spring is being compressed.

A suction pump 17, indicated diagrammatically in Fig. 5, is connected to the line 3 by a valve 18, when this valve is opened, the pump may be operated to cause a suction on the line and the air pressure on the pistons will cause all of them to recede into the cylinders until the sprinkler heads engage the caps 19 on the tops of the cylinders 9. A packing 20 within the cap 19 is shown in Fig. 1.

It will be evident that any suitable form of sprinkler head may be used, and the suction device 17 may be a pump, as shown or any equivalent, such as an ejector. In some installations, the pump 1 might be reversed to provide the suction.

The invention does not reside merely in the details of the devices illustrated, but many changes in form, construction, and arrangement of parts may be made without departure from the invention as claimed.

I claim:

1. A lawn sprinkling system comprising a cylinder, a source of supply of water under pressure communicating with the lower portion of the cylinder, a piston vertically movable within the cylinder and adapted to be moved upward by pressure of water in the cylinder, a sprinkler head carried by the piston, the piston being provided with a passage for water communicating with the sprinkler head, the wall of the cylinder being provided with a by-pass having a lower entrance adapted to be uncovered by the piston near the upper limit of its sliding movement, and the upper end of the by-pass communicating with the passage within the piston.

2. A structure as in claim 1 having a spring arranged to be placed under compression by the piston at its upper position, the arrangement being such that expansion of the compressed spring when the water pressure is cut off will cause sliding movement of the piston to close the entrance of the by pass, whereby air pressure on the piston will cause downward movement when pressure on the water becomes less than atmospheric.

3. A structure as in claim 1 having means to cause sliding movement of the piston to close the by-pass when the source of supply of water is cut off, and having means to reverse the flow of water in the cylinder whereby the air pressure on the piston will force it downward in the cylinder.

4. A lawn sprinkler having a head mounted to move vertically between a lower and an upper position, liquid pressure means to move the head to the uppermost position a valve in the liquid pressure means operable to cause the liquid pressure to be applied or to be discontinued, and suction means between the valve and the sprinkler operable to move the head to the lowermost position.

CLARENCE D. GLOVER.